June 16, 1936.  A. G. HERRESHOFF  2,044,610
VEHICLE
Filed March 7, 1934

INVENTOR.
ALEXANDER G. HERRESHOFF.
BY
ATTORNEYS.

Patented June 16, 1936

2,044,610

UNITED STATES PATENT OFFICE 2,044,610

VEHICLE

Alexander G. Herreshoff, Grosse Pointe Village, Mich., assignor to Chrysler Corporation, Detroit, Mich., a corporation of Delaware Application March 7, 1934, Serial No. 714,426

3 Claims. (Cl. 180—54)

This invention relates to an improved motor vehicle and particularly to improvements in the contour, construction and arrangement of the parts of the front portion thereof, especially the headlamps, radiator, and engine compartment enclosure.

More specifically, the invention provides for the elimination of resistance to forward movement of a vehicle, particularly one of streamline contour, caused by the protrusion of headlamps in advance of the currents of air predetermined by the front end of the main portion of the vehicle.

One of the main objects of the invention is to position the headlamps of a vehicle at a spaced location from the path followed by the larger portion of the air currents sweeping past the vehicle during forward movement thereof, and to obviate protrusion of the headlamps beyond that portion of the vehicle which is constructed and arranged to facilitate the free flow of air currents thereby.

Another object of the invention is to provide an improved headlamp mounting which allows the vehicle to be more closely brought to the contour of streamline requirements.

Further objects of the invention are to provide headlamps on a vehicle which are confined within the engine compartment thereof and to provide means for supporting vehicle headlamps on the radiator core of an engine cooling system which is disposed within an engine compartment; to provide an improved engine compartment closure which has a grill in its front wall for admitting the projection of light rays from the interior of the engine compartment and which also admits air to the core of the radiator; and to provide a grill of this kind having ribs extending in advance of the headlight lenses so as to protect the same from being broken by stones, gravel, and similar material frequently thrown from the road by the tires of a preceding or passing vehicle.

An illustrative embodiment of the invention is shown in the accompanying drawing, in which.

Figure 1:
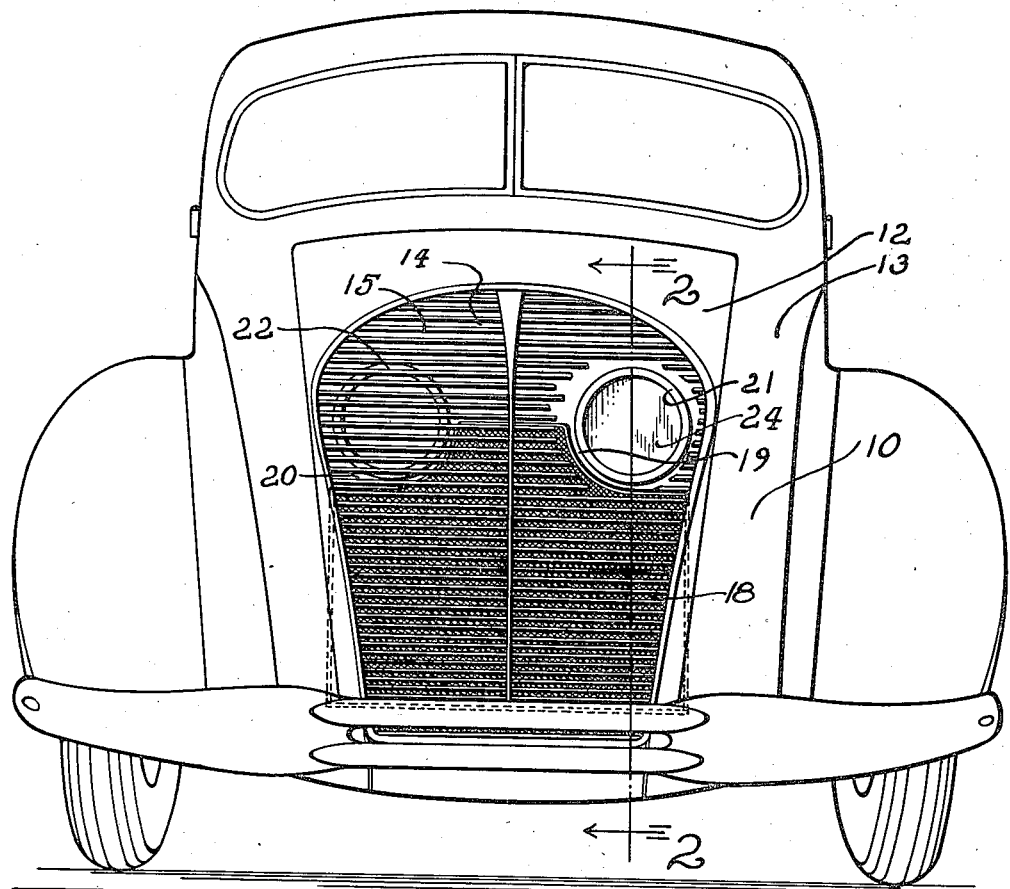
Fig. 1 is a front elevational view of a vehicle embodying my invention showing portions of the vehicle broken away to disclose the underlying structure.
Figure 2:
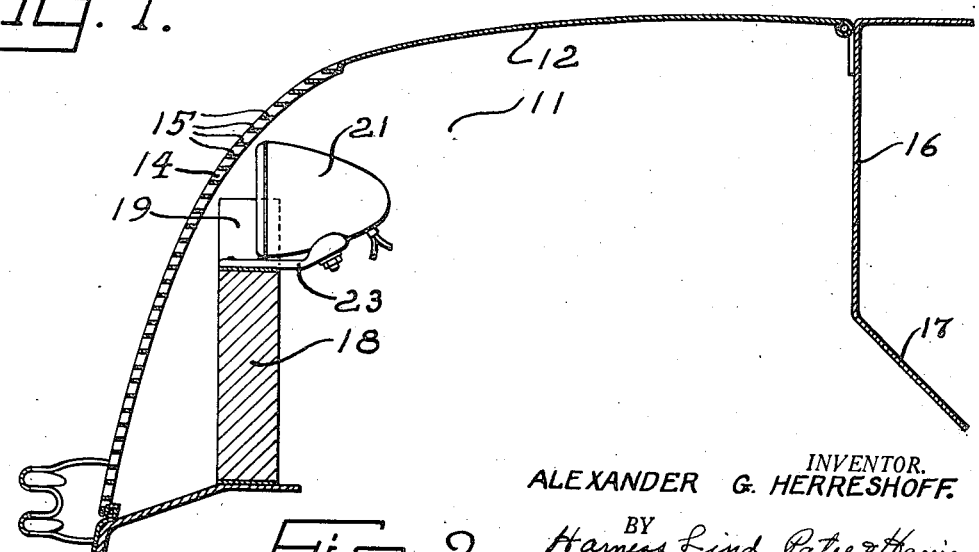
Fig. 2 is a longitudinal, vertical, sectional view taken on the line 2—2 of Fig. 1.

In the form shown, my invention is illustrated in conjunction with a vehicle having a front end portion 10 of streamline contour which includes an engine compartment 11 confined within an enclosure formed mainly by sheet metal hood and cowl sections 12 and 13, respectively. The hood 12 is provided with a grill 14 comprising substantially parallel, transversely extending, spaced ribs 15. The forward end portions of both the hood 12 and cowl sections 13 are curved rearwardly and upwardly so as to direct the air currents created during forward movement of the vehicle in a sweeping course over the latter.

The rear extremity of the engine compartment 11 is substantially sealed by a partition comprising a dash 16 and a toe board 17 which extend transversely of the vehicle. During forward movement of the vehicle, some air currents are admitted to the engine compartment 11 through the spaces between the ribs 15 of the grill 14, but inasmuch as the escapement of such air currents is impeded, a substantial air pressure is built up in the hood compartment which serves as a baffle to assist in the direction of other air currents in a sweeping course over the vehicle. Mounted in the engine compartment 11 adjacent the grill 14 is a radiator core 18 of an engine cooling system. The core 18 is constructed and arranged to receive those air currents which enter the engine compartment. Recesses 19 and 20 are provided in the upper corner portions of the core 18 for accommodating a pair of head lamps 21 and 22 which are supported by brackets 23 mounted on the radiator core. Each headlamp has a lense 24 which is directed toward the grill 14 and adapted to project light rays therethrough.

The headlamps 21 and 22 are located rearwardly of the upwardly directed air currents which pass over the vehicle and they, therefore, do not offer that resistance to forward movement of the vehicle which is present when headlamps or other devices, not conforming to the requirements of air flow contour, are arranged in advance of that portion of the vehicle which is relied upon to direct air currents in a sweeping course upwardly and over the vehicle.

The above arrangement and construction not only eliminates the excessive retardation of forward movement which occurs in conventional vehicles which have their headlamps arranged in advance of substantially all other structure of the front end of the vehicle, but it also provides for protection of the lenses of the headlamps from gravel, stone, and other similar particles of material which are frequently thrown up from the road by tires of a preceding or passing car.

By mounting the headlamps of the vehicle in the engine compartment thereof, the cowl sections, fenders, and other parts of the front end of the vehicle may be more closely brought to a desired streamline contour for it is unnecessary to compromise the shapes of these portions of the vehicle in order to accommodate the headlamps.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. In a vehicle having a front end compartment provided with open forward end and top portions, a closure for said open front end and top portions movable to open position for permitting access to said compartment and having a grill comprising spaced ribs registering with said open end portion, a cooling system radiator in said compartment constructed and arranged to receive air currents admitted through said grill, and a head lamp disposed in said compartment having a light outlet horizontally mis-aligned with said radiator and registering with said grill for projecting light rays directly forwardly through the spaces between said ribs.

2. In a vehicle having a front end compartment provided with open front end and top portions, a closure for said open front end and top portions movable to open position for permitting access to said compartment and having a grill comprising spaced ribs registering with said open end portion, a cooling system radiator core in said compartment constructed and arranged to receive air currents admitted through said grill, and a head lamp disposed in said compartment mounted on said radiator core, said head lamp having a light outlet above said core and directly facing said grill for projecting light rays therethrough.

3. In a vehicle including a frame structure and having a front end compartment provided with open top and front end portions, an engine cooling system radiator core mounted on said frame structure and located at the open front end portion of said compartment, a closure for said open portions movable to open position including a rearwardly curved wall conforming substantially to streamline requirements and comprising a grill in advance of said radiator core for admitting air thereto, said front wall being constructed and arranged to direct air currents in an upwardly and rearwardly sweeping course over said vehicle during forward movement of the latter, and a pair of head lamps in said compartment having light outlets misaligned with said radiator and constructed and arranged to project light rays directly forwardly through said grill.

ALEXANDER G. HERRESHOFF.